US005097662A

United States Patent [19]

Vieth

[11] Patent Number: 5,097,662
[45] Date of Patent: Mar. 24, 1992

[54] APPARATUS FOR INFLUENCING THE FLOW OF AIR THROUGH A PASSAGEWAY

[75] Inventor: Gary L. Vieth, Bellevue, Wash.

[73] Assignee: The Boeing Company, Seattle, Wash.

[21] Appl. No.: 439,848

[22] Filed: Nov. 20, 1989

[51] Int. Cl.⁵ .......................... F02K 3/06; B64C 13/00
[52] U.S. Cl. ..................................... 60/226.2; 60/229; 244/110 B; 239/265.29
[58] Field of Search ............... 60/226.2, 226.1, 229; 244/110 B, 199, 12.5; 239/265.19, 265.25, 265.27, 265.29, 265.31, 265.33, 265.37

[56] References Cited

U.S. PATENT DOCUMENTS

| | | | |
|---|---|---|---|
| 3,475,913 | 11/1969 | Mortlock et al. | 60/229 |
| 3,483,702 | 12/1969 | Ward | 60/229 |
| 3,605,411 | 9/1971 | Maison et al. | 60/226 |
| 3,690,561 | 9/1972 | Potter | 239/265.29 |
| 3,981,451 | 3/1976 | Prior et al. | 239/265.31 |

Primary Examiner—Louis J. Casaregola
Assistant Examiner—Laleh Jalali
Attorney, Agent, or Firm—Dellett, Smith-Hill and Bedell

[57] ABSTRACT

An apparatus for influencing a flow of air through a passageway defined between an inner wall and a double outer wall that includes first and second walls each formed with an opening, comprises a first door, a second door, vortex generation means positioned between the first and second walls and adjacent the upstream end of the opening in the first wall, and an actuator pivotally attached to the first and second doors. The actuator has a first condition wherein the first and second doors close the openings in the first and second walls respectively and has a second condition wherein the first door is at the downstream end of the opening in the first wall and extends across the passageway and directs the flow of air through the opening in the first wall, and the second door is at the down-stream end of the opening in the second wall and deflects the flow of air through that opening.

29 Claims, 6 Drawing Sheets

APPARATUS FOR INFLUENCING THE FLOW OF AIR THROUGH A PASSAGEWAY

BACKGROUND OF THE INVENTION

This invention relates to an apparatus for influencing the flow of air through a passageway and more specifically, but not exclusively, to an apparatus for providing thrust reversal for a turbine engine.

Most fixed-wing airplanes have high landing speeds, which result in a large burden being placed on the wheel brakes. To reduce this burden, most jet airplanes, that is, airplanes that have gas turbine propulsion units, are equipped with thrust reversers which provide a reversed flow of air. In a gas turbine propulsion unit, in which a nacelle surrounds the engine and is spaced outwardly from the engine cowl to define an annular passageway for the flow of air downstream from the engine fan, a large proportion of the total thrust is developed by the reaction to the air driven through the passageway by the fan. In such a propulsion unit, reverse thrust may be provided by blocking the downstream flow of air through the passageway and diverting it laterally and forwardly by employing a combination of blocker doors.

Figure 1:
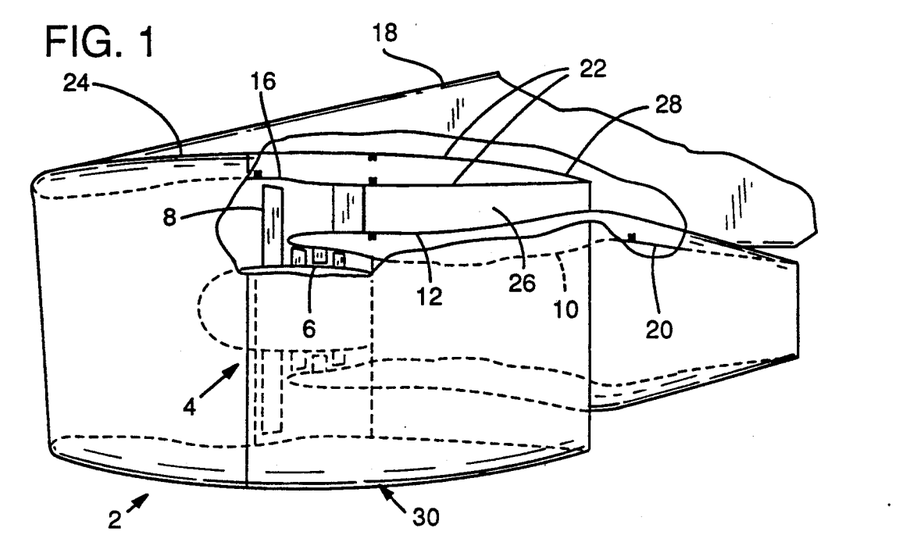
FIG. 1 is a longitudinal-sectional view of a gas turbine propulsion unit.

FIG. 1 is a cross-sectional view of a typical gas turbine propulsion unit 2. Propulsion unit 2 comprises an engine 4 composed of a combustor and turbine (not shown), a compressor 6 and a fan 8. The combustor, turbine and compressor are enclosed by an engine cowl 10, and the fan is enclosed by a fan cowl 16, constituted by the inner wall of a double-walled nacelle 24. An exhaust nozzle 20 is attached to the downstream end of engine 10 to exhaust gases from the engine into the atmosphere. An inner cowl 12 is attached to and supported by the inner wall of the nacelle and covers the engine cowl 10 and engine accessories. When the engine is in use, fan 8 is driven to rotate within fan cowl 16, creating a flow of air to the right of FIG. 1. Part of the flow enters compressor 6 and is delivered to the combustor to support the combustion of fuel, and the rest of the flow passes through a smooth-walled annular passageway, defined between the inner cowl 12 and a double-walled outer cowl 22 that forms part of the nacelle. The flow through annular passageway 26 passes out the rear of the propulsion unit through an annular exit nozzle 28. The nacelle extends forward of fan cowl 16 in the form of an inlet cowl to provide smooth flow surfaces into and around the nacelle.

Figure 2A:
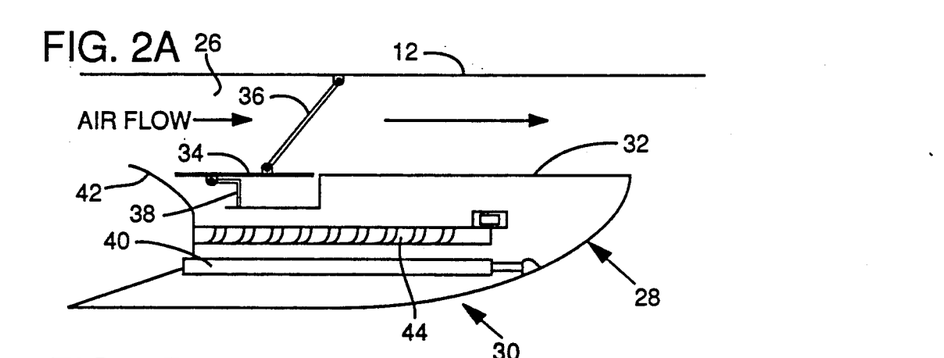
FIGS. 2A and 2B, referred to collectively as FIG. 2, show a longitudinal-sectional view of a prior art thrust reverser in two different configurations.
Figure 2B:
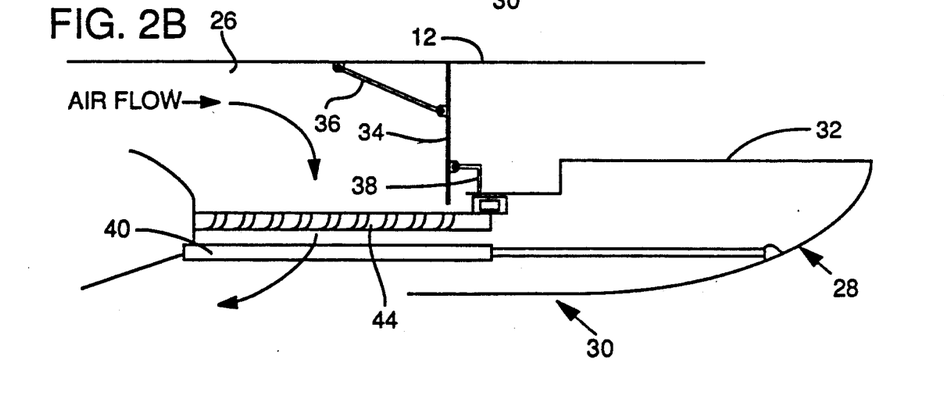

FIGS. 2A and 2B illustrate a portion of a nacelle 30 incorporating a thrust reverser of known construction in a forward thrust configuration and a reverse thrust configuration respectively. The thrust reverser is positioned in a translating sleeve 32, the aft portion of which forms the outer wall of the nozzle 28. A blocker door 34 is attached to the inner cowl 12 by a linkage 36 and to the translating sleeve by a pinned joint 38. The translating sleeve is attached to the structure of the nacelle by actuators 40. A "bullnose" 42 having a convex curvature is positioned upstream of the sleeve 32 adjacent passageway 26 for assisting to turn the flow of air when the apparatus is in the reverse thrust configuration. A plurality of nozzle vents 44 (cascades) to turn the flow are positioned downstream of the bullnose within the translating sleeve.

In the forward thrust configuration shown in FIG. 2A, the blocker door 34 forms part of the inner wall of the nacelle, allowing air flow through the passageway 26 and out of the nozzle 28. In the reverse thrust configuration shown in FIG. 2B, the actuators 40 have translated the sleeve 32 aft, whereby blocker door 34 has pivoted into passageway 26 such that the flow of air is diverted through the nozzle vents 44 in a substantially reverse direction. Translating the sleeve aft opens a gap in the outer wall of the nacelle adjacent the cascades allowing the air to flow from the passageway through the cascades and out into the atmosphere.

In U.S. Pat. No. 3,475,913, Mortlock et al disclose a thrust reverser for a gas turbine engine in which inner and outer doors are pinned at their aft ends and are linked to a ring which is slidably mounted on tracks within a double outer wall of the nacelle and positioned by an actuator. In a first position, the doors are recessed into the walls of the nacelle and form a portion of the wall. In a second position, the doors have swung open, one blocking the rearward flow of air from the fan and the other directing the air in a reverse direction outside the nacelle.

In U.S. Pat. No. 3,483,702, Ward discloses a thrust reverser for a gas turbine engine comprising two doors, a first door pinned at its aft end and linked to a ram slidably mounted on tracks within a double wall of the nacelle and a second door pinned to the first door and to a pivot enclosed in a cam slot. A cascade of vents is positioned in the double wall between the two doors. In a first position, the doors form part of the inner and outer walls respectively of the nacelle and in a second position the first door has swung into the passage to divert the flow of air through the cascade. The second door is positioned outwardly to direct the flow of air in a reverse direction.

In U.S. Pat. No. 3,605,411, Maison et al disclose a thrust reverser comprising two doors positioned in a double-walled nacelle spaced outwardly from an engine cowl to define an annular duct. The doors are pinned to the cowl separately and to each other through a link. The outer door is linked to an actuator. In a first position, the doors form a portion of the wall allowing air to flow through the duct. In a second position, one door has pivoted into the duct blocking the flow of air. The other door is positioned outwardly to influence the air flow in a reverse direction.

In U.S. Pat. No. 3,690,561, Pofter describes a thrust controlling system wherein a nozzle slides rearward thus exposing openings in an air duct and causing two doors to pivot, one blocking the flow of air through the duct and the other directing the air to provide reverse thrust.

SUMMARY OF THE INVENTION

A preferred embodiment of the present invention in a first aspect is an apparatus for influencing a flow of air in a direction from one end of a passageway towards another end of the passageway. The passageway is defined between an inner wall and a double outer wall, the double outer wall including first and second walls each formed with an opening having an upstream end and a downstream end. The apparatus comprises a first door, a second door, vortex generation means positioned between the first and second walls and adjacent the upstream end of the opening in the first wall, and translation means pivotally attached to the first and second doors. The translation means has a first condition wherein the first and second doors close the openings in the first and second walls respectively. The translation means has a second condition wherein the first door is at the downstream end of the opening in the first wall and extends across the passageway and directs the flow of air through the opening in the first wall and the second door is at the downstream end of the opening in the second wall and deflects the flow of air through that opening.

A preferred embodiment of the present invention in a second aspect is an apparatus for influencing a flow of air in a direction from one end of a passageway towards another end of the passageway. The passageway is defined by an inner wall and a double outer wall, the double outer wall including first and second walls each formed with an opening having an upstream end and a downstream end. The apparatus comprises a first door having a first position in which it closes the opening formed in the first wall, and also having a second position. A first linkage means has a first end attached to that end of the first door which is downstream when the first door is in the first position, and a second end attached to the first wall upstream of the opening in the first wall. A second door has a first position in which it closes the opening formed in the second wall, and also has a second position. A second linkage means has a first end attached to that end of the second door which is upstream when the second door is in the first position, and a second end attached to the double wall. A translation means is pivotally attached to the first door upstream of the location at which the first door is attached to the first linkage means and is pivotally attached to the second door downstream of the location at which the second door is attached to the second linkage means. The translation means has a first condition wherein the first and second doors are in their first positions, and a second condition wherein the first door is at the downstream end of the opening in the first wall and extends across the passageway and directs the flow of air through the opening in the first wall and the second door is at the downstream end of the opening in the second wall and deflects the flow of air through that opening.

The invention may be applied to a gas turbine propulsion unit of a jet airplane, in which a fan generates a flow of air through a passageway defined between an inner cowl and a double walled nacelle. In this application, the engine has a forward thrust configuration in which the first and second doors close openings in the double walled nacelle and allow air to flow through the passageway.

For the purpose of defining directions, the terms "upstream" and "downstream" used herein relate to the direction of flow through the passage when the translation means is in the first condition.

BRIEF DESCRIPTION OF THE INVENTION

For a better understanding of the invention, and to show how the same may be carried into effect, reference will now be made, by way of example, to the accompanying drawings in which.

In the figures, like reference numerals designate elements having corresponding functions.

DETAILED DESCRIPTION

The propulsion unit shown in FIGS. 3-7 comprises the inner cowl 12, by which the combustor and compressor are enclosed, and the double-walled cowl 22 coaxially surrounding the inner cowl. Cowl 22 has inner and outer walls 48, 50, which are held in spaced coaxial relationship by struts 100. Each strut is generally trapezoidal in section and has an inner wall 120, an outer wall 122 and two walls 124, 126 that extend in a generally radial direction with respect to the nacelle. Struts 100 are equiangularly spaced about the common axis of the cowl and the nacelle. Preferably, six struts are provided.

Over the major part of the length of cowl 22, the inner and outer walls of the cowl are continuous and are integral with the inner and outer walls respectively of the struts. However, openings 52, 54 (FIGS. 3B, 4B) are formed in the inner and outer walls respectively, a short distance upstream of the exit nozzle. There is one pair of openings between each two adjacent struts.

Figure 3A:
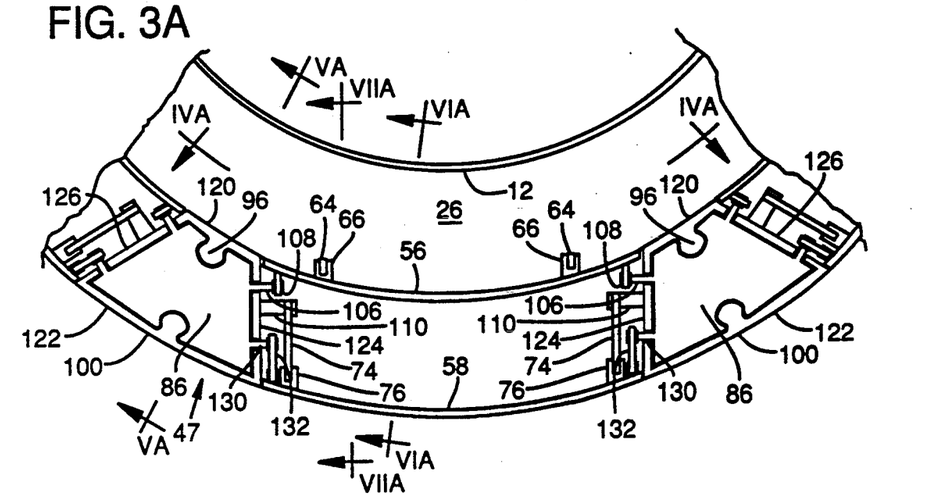
FIGS. 3A and 3B, referred to collectively as FIG. 3, are partial cross sectional views of a gas turbine propulsion unit embodying the invention in two different configurations.
Figure 3B:
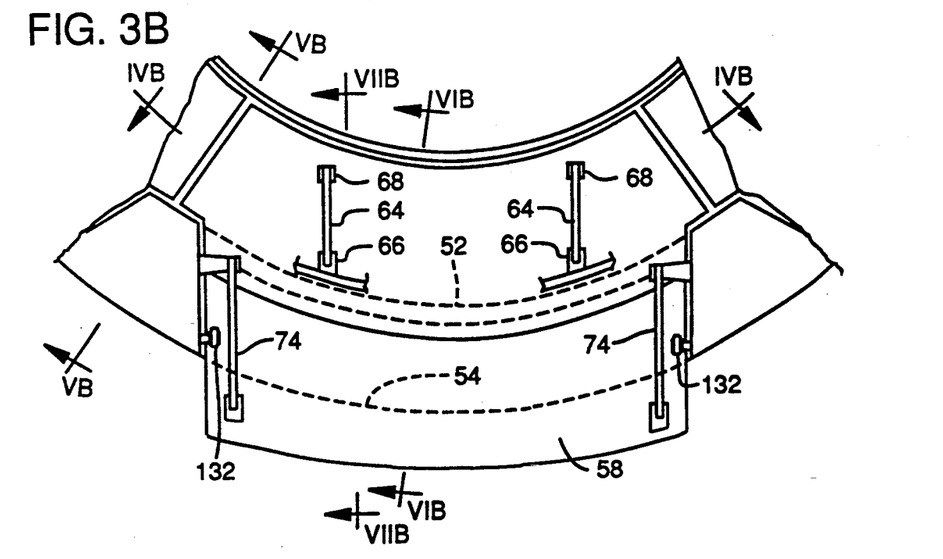
Figure 4A:
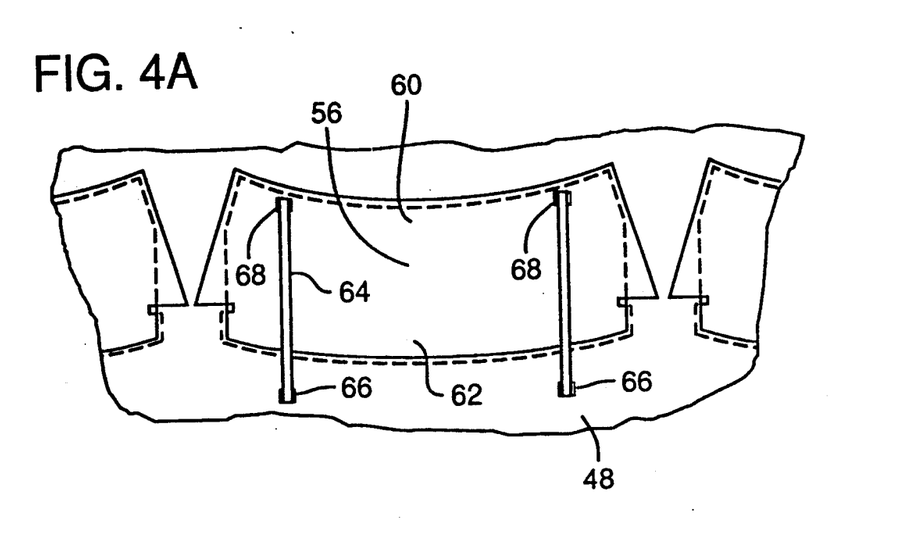
FIGS. 4A and 4B, referred to collectively as FIG. 4, are radial views of the inner wall of the nacelle of the propulsion unit shown in FIG. 3 when in its two different configurations respectively.
Figure 4B:
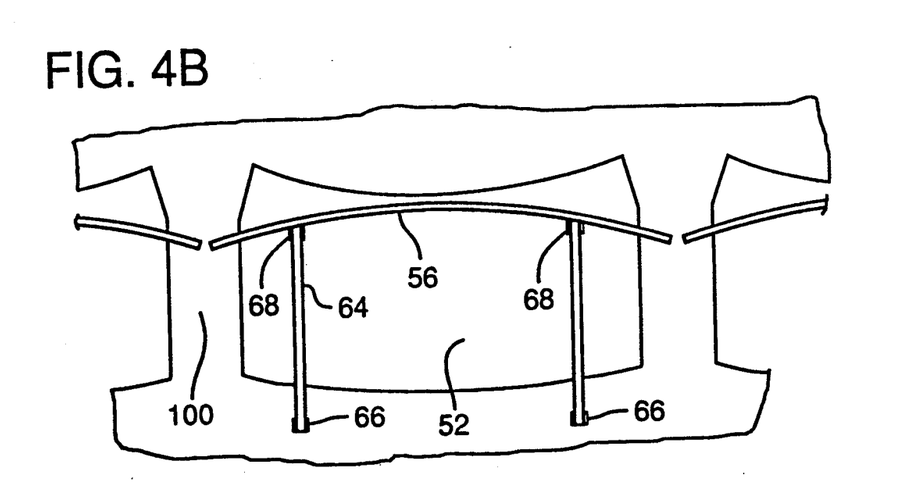
Figure 5A:
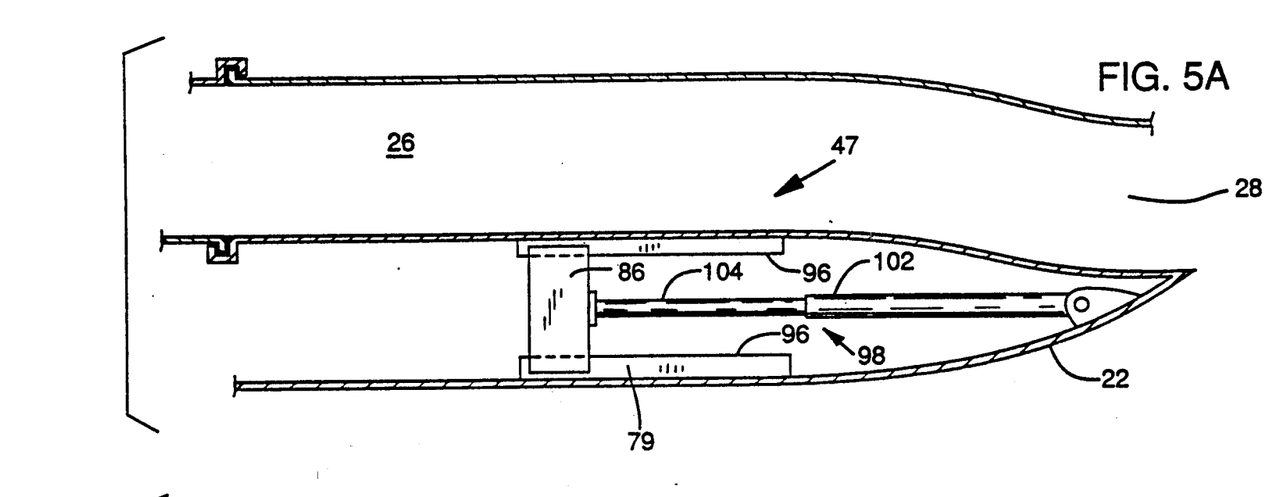
FIGS. 5A and 5B, referred to collectively as FIG. 5, are sectional views, partly cut away, taken on the lines VA—VA and VB—VB in FIGS. 3A and 3B respectively, and show translation means.
Figure 5B:
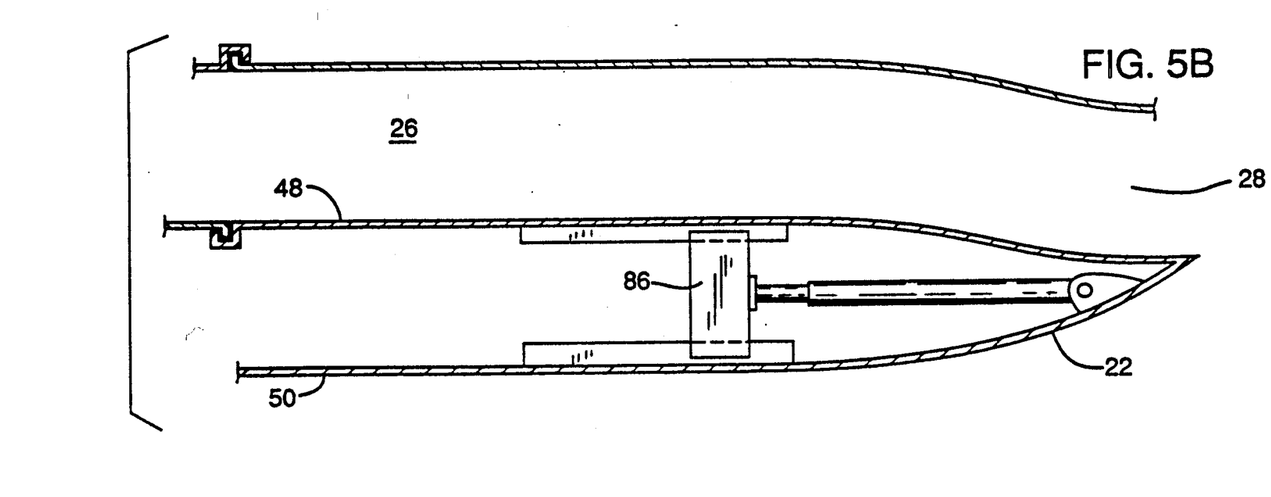
Figure 6A:
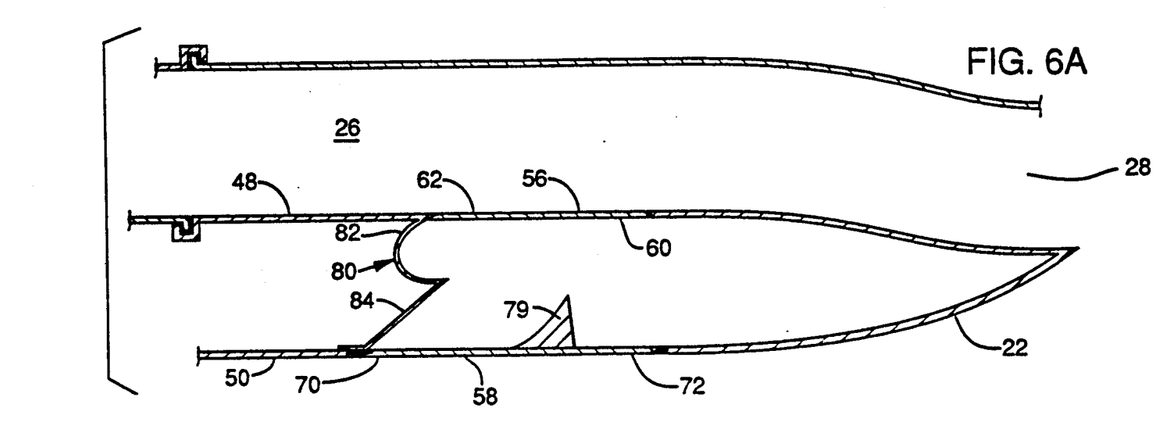
FIGS. 6A and 6B, referred to collectively as FIG. 6, are sectional views taken on the lines VIA—VIA and VIB—VIB of FIGS. 3A and 3B respectively, and show blocker doors.
Figure 6B:
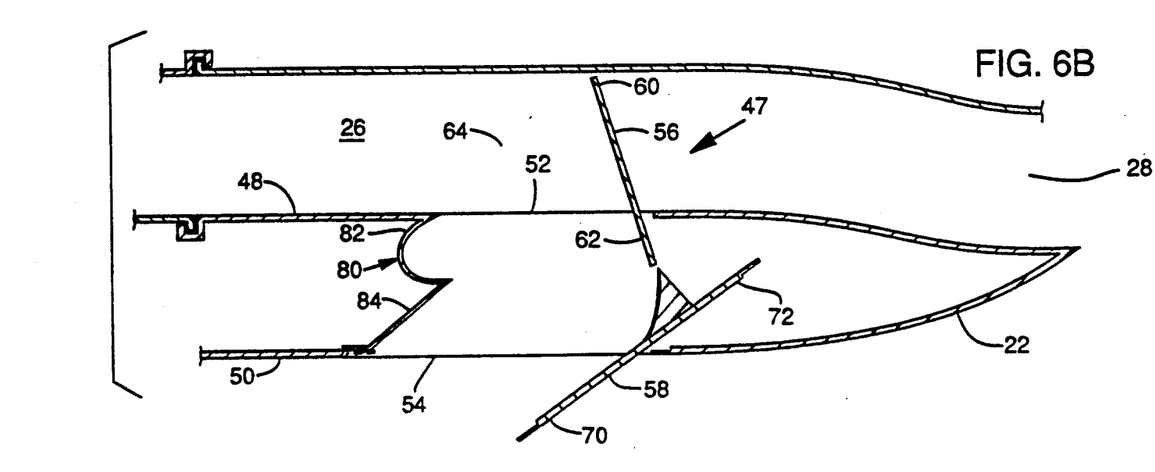

The nacelle of the propulsion unit shown in FIGS. 3-7 includes a thrust reverser 47. Thrust reverser 47 includes doors 56, 58, which are mounted to the nacelle and movable relative to the nacelle between a forward thrust configuration and a reverse thrust configuration. In the forward thrust configuration (FIGS. 3A, 4A, 5A, 6A, 7A), doors 56, 58 block openings 52, 54, whereas in the reverse thrust configuration (FIGS. 3B, 4B, 5B, 6B, 7B) door 56 is at the downstream end of opening 52 in wall 48 and extends across passageway 26 and deflects the flow of air through opening 52, and door 58 is at the downstream end of opening 54 in wall 50 and deflects the flow of air through that opening. In the reverse thrust configuration, the flow of air through opening 54 has a component in a reverse direction with respect to the flow of air through passageway 26 thereby providing reverse thrust. Actuators 98 that are accommodated in struts 100 and are coupled to doors 56, 58 act in cooperation with links that couple doors 56, 58 to structural components that are stationary relative to struts 100 to bring about pivotal movement of doors 56, 58 between the forward thrust configuration and the reverse thrust configuration. As shown in FIG. 5, actuator 98 comprises a slider 86 mounted on tracks 96 inside the strut and an actuator cylinder 102 mounted inside the strut to the rear of the slider and having a piston rod 104 attached to the slider. As shown in FIG. 3A, each slider 86 is coupled to two adjacent pairs of doors 56, 58, and each pair of doors 56, 58 is coupled to two adjacent sliders 86 disposed in the struts to either side of the doors. The actuators in the respective struts operate in unison thereby moving the doors in unison.

Figure 7A:
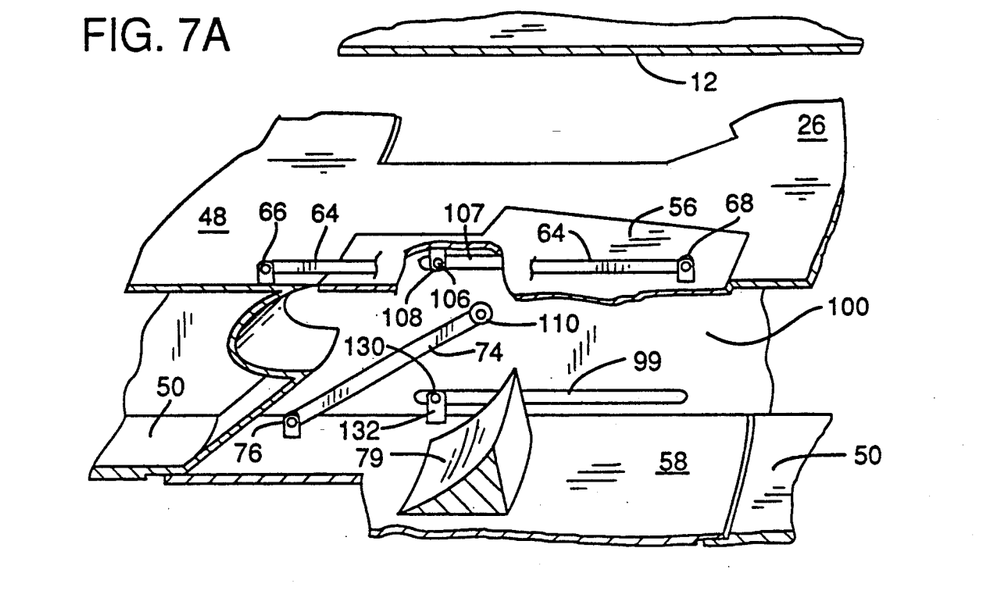
FIGS. 7A and 7B, referred to collectively as FIG. 7, are offset sectional views taken on the lines VIIA—VIIA and VIIB—VIIB of FIGS. 3A and 3B respectively, showing door and linkage relationships.
Figure 7B:
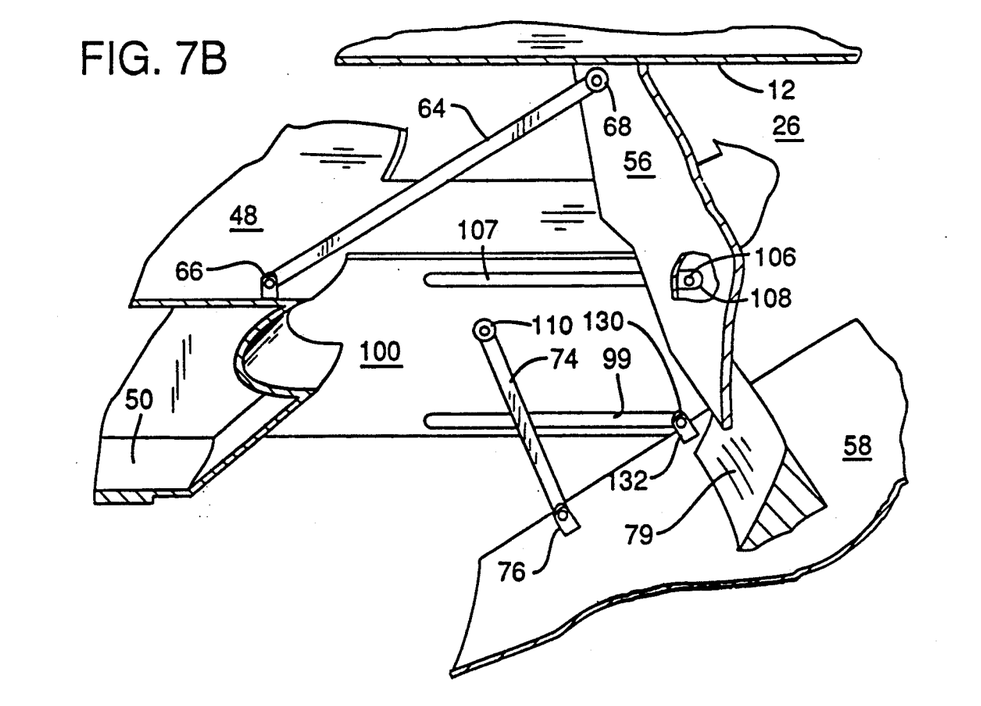

As shown in FIGS. 3, 4 and 7, door 56 is coupled to inner wall 48 of nacelle 22 by a pair of links 64. One end of each link 64 is attached by a pin to a fitting 66 on the inner wall 48 upstream of opening 52. The other end of link 64 is attached by a pin to a fitting 68 on the first end 60 of door 56. First end 60 of door 56 is downstream of the second end 62 of door 56 when door 56 is in the forward thrust configuration. Second end 62 of door 56 is coupled to the sliders in two adjacent struts by fittings 108 that engage rods 106 projecting from sliders 86 through slots 107 in the side walls of struts 100.

Door 58 is coupled to two adjacent struts 100 by links 74. One end of each link 74 engages a pin that is connected to an arm 110 projecting from strut 100 inside the double walled nacelle. The other end of link 74 is attached by a pin to a fitting 76 on a first end 70 of door 58. First end 70 of door 58 is upstream of the second end 72 of door 58 when door 58 is in the forward thrust configuration. Door 58 is coupled intermediate its first and second ends to the sliders 86 in the two adjacent struts. A rod 130 projects from slider 86 through a slot 99 in the side wall of strut 100 and engages a fitting 132 attached to door 58.

A flow turning device 79 (FIGS. 6 and 7) is attached to door 58 towards the second end 72 and projects into the double walled nacelle. A vortex generation device 80 is positioned between inner wall 48 and outer wall 50 and adjacent the upstream end of opening 52 in inner wall 48. Vortex generation device 80 includes a member 82 defining a semicircular recess that is concave toward the spaced between the first and second openings and also includes a wall member 84. The member 82 is positioned immediately adjacent inner wall with the semicircular recess facing downstream. Wall member 84 is connected between member 82 and wall 50 at the upstream end of opening 54.

In the forward thrust configuration (FIGS. 3A, 4A, 5A, 6A, 7A), the slider 86 is in a position such that doors 56 and 58 are positioned in the openings in inner wall 48 and outer wall 50 respectively, allowing air to flow from fan 8 through passageway 26 out nozzle 28 into the atmosphere. At its forward end, door 56 has a lip that is radially outward of a corresponding lip of strut 110, whereas at its aft end the lip of door 56 is radially inward of a sealing surface of strut 100. Conversely, door 58 has a lip at its forward end that is radially outward of a sealing surface of strut 100 and has a lip at its aft end that is radially inward of a lip of strut 100. This arrangement of seals provides efficient sealing of the interior space of the strut without interfering with movement of the doors.

When member 86 is translated rearwards to a second position, link 64 and rod 106 pivot door 56 such that it extends across passageway 26, the first end 60 being close to inner cowl 12 and the second end 62 extending into the space between inner wall 48 and outer wall 50. Link 74 and rod 130 pivot door 58 such that the upstream end of door 58 extends outside outer wall 50 and the downstream end of door 58 extends into the space between inner wall 48 and outer wall 50. Thrust reverser 47 is thereby placed in its reverse thrust configuration (FIGS. 3B, 4B, 5B, 6B, 7B), in which the air flow in passage 26 is diverted through the openings in walls 48 and 50 and outer door 58 directs the air flow so that it has a component in the upstream direction and provides reverse thrust. In the reverse thrust configuration, vortex generation device 80 generates a vortex that turns the flow of air upstream and increases the component of air flow in the reverse direction and the forward surface of flow turning device 79 is substantially aligned with door 62 and therefore forms a bridge between the second end 62 of door 56 and door 58 thereby providing a more continuous surface for reversing the direction of the air flow and increasing the reverse thrust.

It will be appreciated that the invention is not restricted to the particular embodiment that has been described and illustrated, and that variations may be made therein without departing from the scope of the invention as defined in the appended claims and equivalents thereof. For example, the invention is not restricted to there being six struts connecting the inner cowl to the nacelle, and fewer or more struts than six may be provided. It is not essential that each strut include an actuator, since the actuators may be connected to a ring that extends around the nacelle, through all the struts, and is connected to all the sliders. The cross-sectional configuration of the struts is not critical, so long as the struts do not interfere with movement of the doors.

I claim:

1. An apparatus for influencing a flow of air in a direction from one end of a passageway towards another end of the passageway, the passageway being defined between an inner wall and a double outer wall, the double outer wall including first and second walls each formed with an opening having an upstream end and a downstream end, the first wall having an edge region that extends along the upstream end of the opening in the first wall and the second wall having an edge region that extends along the upstream end of the opening in the second wall, and the apparatus comprising:

a first door, a second door, vortex generation means positioned between the first and second walls and adjacent the upstream end of the opening in the first wall for generating vortices in a flow of air from said passageway through the openings in said first and second walls, the vortex generation means comprising a vortex generation member that joins the edge region of the first wall to the edge region of the second wall, and translation means pivotally attached to said first and second doors, said translation means having a first condition wherein said first and second doors close the openings in said first and second walls respectively, and a second condition wherein said first door is at the downstream end of the opening in the first wall and extends across said passageway and directs the flow of air through the opening in the first wall and said second door is at the downstream end of the opening in the second wall and deflects the flow of air through that opening.

2. The apparatus as recited in claim 1, further comprising a flow turning device attached to said second door.

3. The apparatus as recited in claim 1, wherein said second door consists of a single door.

4. The apparatus as recited in claim 1, wherein said inner wall, said first wall, and said second wall are spatially fixed.

5. The apparatus as recited in claim 1, wherein said translation means is slidably positioned between the first and second walls.

6. The apparatus as recited in claim 1, comprising actuator means effective between the translation means and said first and second walls for displacing the translation means between a first position and a second position, in which the translation means is in its first condition and its second condition respectively.

7. Propulsion apparatus comprising:

a fan, an engine connected drivingly to said fan, whereby the fan provides a flow of air, the engine being downstream of said fan and receiving a first portion of the flow of air and providing thrust, an inner cowl around said engine, a double-walled nacelle positioned around said cowl and forming an annular passageway receiving a second portion of the flow of air, said nacelle including first and second walls each formed with an opening having an upstream end and a downstream end, the first wall having an edge region that extends along the upstream end of the opening in the first wall and the second wall having an edge region that extends along the upstream end of the opening in the second wall, a first door, a second door, vortex generation means positioned between the first and second walls and adjacent the upstream end of the opening in the first wall for generating vortices in a flow of air from said passageway through the openings in said first and second walls, the vortex generation means comprising a vortex generation member that joins the edge region of the first wall to the edge region of the second wall, and translation means pivotally attached to said first and second doors, said translation means having a forward thrust condition wherein said first and second doors close the openings in said first and second walls respectively, and a reverse thrust condition wherein said first door is at the downstream end of the opening in the first wall and extends across said passageway and directs the flow of air through the opening in the first wall and said second door is at the downstream end of the opening in the second wall and deflects the flow of air through that opening.

8. An apparatus for influencing a flow of air in a direction from one end of a passageway towards another end of the passageway, the passageway being defined by an inner wall and a double outer wall, the double outer wall including first and second walls each formed with an opening having an upstream end and a downstream end, the apparatus comprising:

a first door having a first position in which it closes the opening formed in the first wall, and also having a second position, first linkage means having a first end attached to that end of said first door which is downstream when said first door is in said first position, and a second end attached to the first wall upstream of the opening in the first wall, a second door having a first position in which it closes the opening formed in the second wall, and also having a second position, second linkage means having a first end attached to that end of said second door which is upstream when said second door is in said first position, and a second end attached to the double wall, and translation means pivotally attached to said first door upstream of the location at which the first door is attached to said first linkage means and pivotally attached to said second door downstream of the location at which the second door is attached to said second linkage means, said translation means having a first condition wherein said first and second doors are in their first positions, and a second condition wherein said first door is at the downstream end of the opening in the first wall and extends across said passageway and directs the flow of air through the opening in the first wall and said second door is at the downstream end of the opening in the second wall and deflects the flow of air through that opening.

9. Propulsion apparatus comprising:

a fan, an engine connected drivingly to said fan, whereby the fan provides a flow of air, the engine being downstream of said fan and receiving a first portion of the flow of air and providing thrust, an inner cowl around said engine, a double walled nacelle positioned around said cowl and forming an annular passageway receiving a second portion of the flow of air, said nacelle including first and second walls each formed with an opening having an upstream end and a downstream end, a first door having a first position in which it closes the opening formed by the first wall, and also having a second position, first linkage means having a first end attached to that end of said first door which is downstream when said first door is in said first position, and a second end attached to the first wall upstream of the opening in the first wall, a second door having a first position in which it closes the opening formed by the second wall, and also having a second position, second linkage means having a first end attached to that end of said second door which is upstream when said second door is in said first position, and a second end attached to the double wall, and translation means pivotally attached to said first door upstream of the location at which the first door is attached to said first linkage means and pivotally attached to said second door downstream of the location at which the second door is attached to said second linkage means, said translation means having a forward thrust condition wherein said first and second doors are in their first positions, and a reverse thrust condition wherein said first door is at the downstream end of the opening in the first wall and extends across said passageway and directs the flow of air in said passageway through the opening in the first wall and said second door is at the downstream end of the opening in the second wall and deflects the flow of air through that opening.

10. The apparatus as recited in claim 9, wherein the translation means is movable from said forward thrust condition to said reverse thrust condition and said first and second linkage means are effective for pivoting the respective doors.

11. The apparatus as recited in claim 9, comprising vortex generation means positioned between the first and second walls and adjacent the upstream end of the opening in the first wall.

12. The apparatus as recited in claim 11, wherein said vortex generation means has a semi-circular shape.

13. The apparatus as recited in claim 9, further comprising a flow turning device attached to said second door.

14. The apparatus as recited in claim 9, wherein said second door consists of a single door.

15. The apparatus as recited in claim 9, wherein said inner wall, said first wall, and said second wall are spatially fixed.

16. The apparatus as recited in claim 9, wherein said translation means is slidably positioned between the first and second walls.

17. The apparatus as recited in claim 9, comprising actuator means effective between the translation means and said first and second walls for displacing the translation means between a first position and a second position, in which the translation means is in its forward thrust condition and its reverse thrust condition respectively.

18. The apparatus as recited in claim 1, wherein the vortex generation member provides a continuous surface joining the edge region of the first wall to the edge region of the second wall.

19. The apparatus as recited in claim 1, wherein the vortex generation member is concave toward the space between the openings in the first and second walls.

20. The apparatus as recited in claim 1, wherein said inner wall, said first wall and said second wall are spatially fixed, and said apparatus further comprises actuator means located downstream of the openings in the first and second walls and effective between the translation means and said first and second walls for displacing the translation means between a first position and a second position, in which the translation means is in its first condition and its second condition respectively.

21. The apparatus as recited in claim 1, wherein said inner wall, said first wall and said second wall are spatially fixed, and the apparatus further comprises a flow turning device attached to said second door.

22. An apparatus for influencing a flow of air in a direction from one end of a passageway towards another end of the passageway, the passageway being defined between an inner wall and a double outer wall, the double outer wall including first and second walls each formed with an opening having an upstream end and a downstream end, the apparatus comprising:
a first door,
a second door,
vortex generation means positioned between the first and second walls and adjacent the upstream end of the opening in the first wall for generating vortices in a flow of air from said passageway through the openings in said first and second walls, and
translation means pivotally attached to said first and second doors, said translation means having a first condition wherein said first and second doors close the openings in said first and second walls respectively, and a second condition wherein said first door is at the downstream end of the opening in the first wall and extends across said passageway and directs the flow of air through the opening in the first wall and said second door is at the downstream end of the opening in the second wall and deflects the flow of air through that opening and wherein when said translation means changes from said first condition to said second condition, the first door moves form a position in which it closes the opening in the first wall to a position in which that end of the first door which is downstream when the translation means is in the first condition is adjacent said inner wall and that end of the first door which is upstream when the translation means is in the first condition is between the first and second walls.

23. The apparatus as recited in claim 22, wherein when the translation means changes from said first condition to said second condition, the second door moves from a position in which it closes the opening in the second wall to a position in which that end of the second door which is upstream when the translation means is in the first condition is outward of the second wall and that end of the second door which is downstream when the translation means is in the first condition is between the first and second walls, and wherein the apparatus further comprises a flow turning device attached to said second door and substantially aligned with the first door when said translation means is in said second condition.

24. The apparatus as recited in claim 7, wherein the vortex generation member provides a continuous surface joining the edge region of the first wall to the edge region of the second wall.

25. The apparatus as recited in claim 7, wherein the vortex generation member is concave toward the space between the openings in the first and second walls.

26. Propulsion apparatus comprising:
a fan,
an engine connected drivingly to said fan, whereby the fan provides a flow of air, the engine being downstream of said fan and receiving a first portion of the flow of air and providing thrust,
an inner cowl around said engine,
a double-walled nacelle positioned around said cowl and forming an annular passageway receiving a second portion of the flow of air, said nacelle including first and second walls each formed with an opening having an upstream end and a downstream end,
a first door,
a second door,
vortex generation means positioned between the first and second walls and adjacent the upstream end of the opening in the first wall for generating vortices in a flow of air from said passageway through the openings in said first and second walls, and
translation means pivotally attached to said first and second doors, said translation means having a forward thrust condition wherein said first and second doors close the openings in said first and second walls respectively, and a reverse thrust condition wherein said first door is at the downstream end of the opening in the first wall and extends across said passageway and directs the flow of air through the opening in the first wall and said second door is at the downstream end of the opening in the second wall and deflects the flow of air through that opening and wherein when said translation means changes from said first condition to said second condition, the first door moves from a position in which it closes the opening in the first wall to a position in which that end of the first door which is downstream when the translation means is in the first condition is adjacent said inner wall and that end of the first door which is upstream when the translation means is in the first condition is between the first and second walls.

27. The apparatus as recited in claim 26, wherein when the translation means changes from said first condition to said second condition, the second door moves from a position in which it closes the opening in the second wall to a position in which that end of the second door which is upstream when the translation means is in the first condition is outward of the second wall and that end of the second door which is downstream when the translation means is in the first condition is between the first an second walls, and wherein the apparatus further comprises a flow turning device attached to said second door and substantially aligned with the first door when said translation means is in said second condition.

28. An apparatus for influencing a flow of air in a direction from one end of a passageway towards another end of the passageway, the passageway being defined between an inner wall and a double outer wall, the double outer wall including first and second walls each formed with an opening having an upstream end and a downstream end, the apparatus comprising:
   a first door,
   a second door,
   vortex generation means positioned between the first and second walls and adjacent the upstream end of the opening in the first wall,
   translation means pivotally attached to said first and second doors, said translation means having a first condition wherein said first and second doors close the openings in said first and second walls respectively, and a second condition wherein said first door is at the downstream end of the opening in the first wall and extends across said passageway and directs the flow of air through the opening in the first wall and said second door is at the downstream end of the opening in the second wall and deflects the flow of air through that opening, the translation means being attached to the first door at a location upstream of that end of the first door which is downstream when the translation means is in the first condition and being attached to the second door at a location downstream of that end of the second door which is upstream when the translation means is in the first condition,
   first linkage means having a first end attached to said first door at a location downstream of the location at which the translation means is attached to the first door and a second end attached to the first wall upstream of the opening in the first wall, and
   second linkage means having a first end attached to said second door at a location upstream of the location at which the translation means is attached to the second door and a second end attached to the double wall,
   said first and second linkage means being effective for pivoting the respective doors when said translation means changes from said first condition to said second condition.

29. An apparatus for influencing a flow of air in a direction from one end of a passageway towards another end of the passageway, the passageway being defined between an inner wall and a double outer wall, the double outer wall including first and second walls each formed with an opening having an upstream end and a downstream end, the apparatus comprising:
   a first door,
   a second door,
   semicircular vortex generation means positioned between the first and second walls and adjacent the upstream end of the opening in the first wall, and
   translation means pivotally attached to said first and second doors, said translation means having a first condition wherein said first and second doors close the openings in said first and second walls respectively, and a second condition wherein said first door is t the downstream end of the opening in the first wall and extends across said passageway and directs the flow of air through the opening in the first wall and said second door is at the downstream end of the opening in the second wall and deflects the flow of air through the opening.

* * * * *

UNITED STATES PATENT AND TRADEMARK OFFICE
CERTIFICATE OF CORRECTION

PATENT NO. : 5,097,662
DATED : March 24, 1992
INVENTOR(S) : Gary L. Vieth It is certified that error appears in the above-identified patent and that said Letters Patent is hereby corrected as shown below:

On the title page, in the ABSTRACT, line 15, "down-stream" should read --downstream--.

Column 3, line 55, "BRIEF DESCRIPTION OF THE INVENTION" should read --BRIEF DESCRIPTION OF THE DRAWINGS--.

Column 5, line 33, "spaced" should read --space--.

Column 5, line 35, "inner wall" should read --inner wall 48--.

Column 9, line 68, "form" should read --from--.

UNITED STATES PATENT AND TRADEMARK OFFICE
CERTIFICATE OF CORRECTION

PATENT NO. : 5,097,662

DATED : March 24, 1992

INVENTOR(S) : Gary L. Vieth

It is certified that error appears in the above-identified patent and that said Letters Patent is hereby corrected as shown below:

Column 12, line 36, "door is t" should read --door is at--.

Column 12, line 41, "the opening" should read --that opening--.

Signed and Sealed this

Fifth Day of October, 1993

*Attest:*

BRUCE LEHMAN

*Attesting Officer*   *Commissioner of Patents and Trademarks*